(12) United States Patent
Davis

(10) Patent No.: US 8,490,096 B2
(45) Date of Patent: Jul. 16, 2013

(54) EVENT PROCESSOR FOR JOB SCHEDULING AND MANAGEMENT

(75) Inventor: Bradford C. Davis, Erie, CO (US)

(73) Assignee: CA, Inc., Islandia, NY (US)

( * ) Notice: Subject to any disclaimer, the term of this patent is extended or adjusted under 35 U.S.C. 154(b) by 1809 days.

(21) Appl. No.: 10/890,471

(22) Filed: Jul. 12, 2004

(65) Prior Publication Data
US 2005/0022199 A1  Jan. 27, 2005

Related U.S. Application Data

(60) Provisional application No. 60/486,505, filed on Jul. 11, 2003.

(51) Int. Cl.
*G06F 9/46* (2006.01)

(52) U.S. Cl.
USPC .......................................... 718/102; 719/318

(58) Field of Classification Search
USPC ....... 718/100–102; 719/318; 707/1–5; 714/4; 709/203
See application file for complete search history.

(56) References Cited

U.S. PATENT DOCUMENTS

| | | | |
|---|---|---|---|
| 5,928,323 A | 7/1999 | Gosling et al. | |
| 5,974,443 A | 10/1999 | Jeske | |
| 6,012,081 A * | 1/2000 | Dorn et al. | 718/102 |
| 6,185,609 B1 * | 2/2001 | Rangarajan et al. | 709/219 |
| 6,289,334 B1 | 9/2001 | Reiner et al. | |
| 6,433,795 B1 | 8/2002 | MacNaughton et al. | |
| 6,542,920 B1 | 4/2003 | Belkin et al. | |
| 6,694,362 B1 * | 2/2004 | Secor et al. | 709/223 |
| 6,721,765 B2 | 4/2004 | Gosh et al. | |
| 6,725,213 B1 * | 4/2004 | Chiocca et al. | 707/3 |
| 6,782,424 B2 * | 8/2004 | Yodaiken | 709/224 |
| 6,859,824 B1 * | 2/2005 | Yamamoto et al. | 709/217 |
| 7,028,225 B2 * | 4/2006 | Maso et al. | 714/47 |
| 7,028,303 B2 * | 4/2006 | Lahey et al. | 718/106 |
| 2002/0052954 A1 * | 5/2002 | Polizzi et al. | 709/225 |
| 2003/0154404 A1 | 8/2003 | Beadles et al. | |
| 2005/0027845 A1 * | 2/2005 | Secor et al. | 709/223 |
| 2005/0076106 A1 * | 4/2005 | Hummer | 709/223 |

OTHER PUBLICATIONS

European Patent Office, "Communication," Application No. 04778165.3- 2211/19652117, PCT/US2004022523, Jun. 30, 2010, 6 pages.

European Patent Office, "Communication," Application No. 04778165.3- 2211/19652117, PCT/HCD/J00048473EP, Oct. 18, 2010, 6 pages.

Summons to attend oral proceedings pursuant to Rule 115(1) EPC; Reference No. HCD/J00048473EP; Application No./Patent No. 04778165.3-2211/1652117 Mar. 15, 2012.

Provision of the minutes in accordance with Rule 124(4) EPC as issued by the EPO for Application No. 04 778 165.3-2211; Ref.: HCD/J00048473EP, Jul. 18, 2012.

Decision to refuse a European Patent application as issued by the EPO for Application No. 04 778 165.3-2211; Ref.: HCD/J00048473EP, Jul. 18, 2012.

\* cited by examiner

*Primary Examiner* — Jennifer To
(74) *Attorney, Agent, or Firm* — Baker Botts, LLP

(57) ABSTRACT

Event processor system and method for job scheduling and management applications are provided. A single process event processor comprises a plurality of threads enabled to handle one or more events. Each of the plurality of threads is asynchronous and has a database connection.

12 Claims, 2 Drawing Sheets

EVENT PROCESSOR FOR JOB SCHEDULING AND MANAGEMENT

CROSS-REFERENCE TO RELATED APPLICATIONS

This application claims the benefit of U.S. Provisional Patent Application No. 60/486,505 entitled EVENT PROCESSOR FOR JOB SCHEDULING AND MANAGEMENT APPLICATIONS filed on Jul. 11, 2003, the entire disclosure of which is incorporated herein by reference.

TECHNICAL FIELD

This application relates generally to computer systems, and more particularly to enterprise-wide process scheduling.

BACKGROUND

Event processing and job scheduling systems typically schedule events and jobs on one or more computer nodes. Despite substantial backlog of work to be processed, however, many of the currently existing event processors still underutilize the cpu (central processing unit) and i/o (input/output) resources. Accordingly, an improved event processing and job scheduling system is desirable.

SUMMARY

Event processor system and method for job scheduling and management applications are provided. The system, in one aspect, includes a single process event processor comprising a plurality of threads enabled to handle one or more events. Each of the plurality of threads is asynchronous and has a database connection.

The plurality of threads includes at least one or more event processor threads operable to retrieve an event and dispatch an event. The plurality of threads also may include one or more connectivity threads operable to establish communication with one or more agents residing on a node where the event is to be processed. The plurality of threads may further include one or more event handler threads operable to receive the event dispatched by the one or more event processor threads. The one or more event handler threads are further operable to communicate the event to the one or more connectivity threads. The plurality of threads is enabled to handle failover.

The method, in one aspect, includes providing a single process event processor having a plurality of threads for handling one or more events, enabling each of the plurality of threads to be asynchronous, and enabling each of the plurality of threads to have database connection.

The method may further include providing one or more event processor threads operable to retrieve an event and dispatch an event and providing one or more connectivity threads. The one or more connectivity threads are operable to establish communication with one or more agents residing on a node where the event is to be processed.

The method may further include providing one or more event handler threads operable to receive the event dispatched by the one or more event processor threads. The one or more event handler threads are operable to communicate the event to the one or more connectivity threads.

Further features as well as the structure and operation of various embodiments are described in detail below with reference to the accompanying drawings. In the drawings, like reference numbers indicate identical or functionally similar elements.

DETAILED DESCRIPTION

Figure 1:
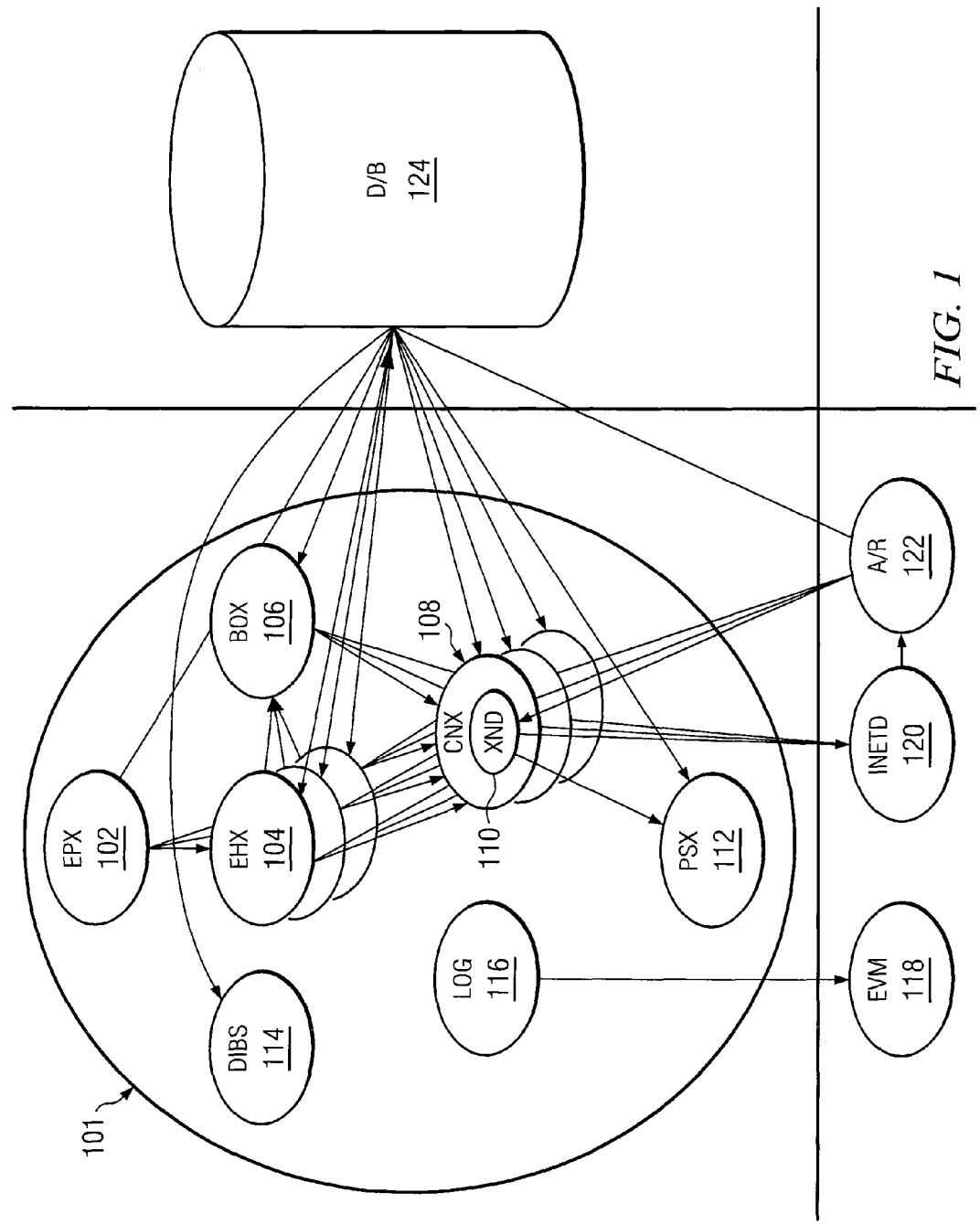
FIG. 1 is a block diagram illustrating the components of the event processor in one embodiment of the present disclosure.

FIG. 1 is a block diagram illustrating the components of the event processor in one embodiment of the present disclosure. Event processor 101 of the present disclosure in one embodiment is a single multi-threaded event processor. Each thread component shown is asynchronous and has its own database connection in one embodiment. Epx 102 iterates in a tight loop on get_event and dispatches these events to an event handler ehx 104. Event handler ehx 104 may be arrayed. Box 106 performs the initial processing of box jobs, for example, check and start, and dispatches that result to cnx 108.

The cnx 108, in one embodiment qualifies and starts jobs. For instance, cnx 108 checks one or more conditions on whether a job can be started. Such conditions may include whether a job is waiting for another job to complete, etc. Cnx 108 can be arrayed and may include an xnd 110 thread that communicates with the auto_remote, that is, an agent that runs on each machine or node and processes jobs running on respective machine or node. Cnx 108 may communicate with the auto_remote, for example, by executing the code the start_rem_job. The xnd 110, in one embodiment, performs inetd/auto_remote connectivity and communication, and need not own a d/b (database) connection. Rather, in one embodiment, a messaging transport mechanism may be used to communicate with database software.

Psx 112 performs post starting processing, for example, checking whether a process started. Dibs 114 performs the failover algorithm directly against primary and shadow database in one embodiment. This takes the auto_remote and inetd out of the algorithm and reduces a substantial number of potential failure points.

Briefly, inetd refers to a daemon program that listens for connection requests or messages for selected ports and starts server programs to perform the services associated with those ports. Auto_remote refers to agents residing on one or more nodes to run and process a job on the respective nodes. Failover refers to automatically switching to a redundant or standby server, system, or network upon failure or abnormal termination of the currently-active server, system, or network. Log 116 or individual thread dispatches msgs (messages) to an event manager 118 such as the Unicenter™ Event Manager.

In one embodiment, interactions with databases are optimized and the xnd thread 110 in the cnx 108 are allowed to be independent of the database. Allowing the xnd thread 110 to be independent of the database reduces scenarios where processes are hung up waiting for database server to service them. For instance, processes are blocked on the data server and the data server blocks on i/o.

In one embodiment of the event processor described in the present application, database activity is distributed across each thread where each thread has access to a pool of database connections. Accordingly, an operating system (os) scheduler can find an xnd 110 that is not pinned against the database 124. The xnd sub-thread of the cnx breaks the logjam and improves job starts.

In one embodiment, dividing up the event processor into various components as shown in FIG. 1, a plurality of database transactions can be identified and consolidated. Moreover, redundant and therefore unnecessary database transactions may be eliminated or at least consolidated.

The decomposition of the event processor enables queuing between processes (ultimately threads) and allows replacing of several areas of iterative processing with batch processing. In boxes 106, job rows are picked up one per transaction. In the epx 102, s plurality of qualified events routinely build up in the event table but are fetched one per transaction. Both of these situations benefit with the batch processing of rows from those respective tables. This will speed throughput while reducing pressure on the system.

The exemplary event processor brings the plurality of processes described above into a single process. Thus, for example, the failover and rollover models become easier to implement since the designs are simpler and more robust. Neither the failover nor rollover models need to work in the context of the event processor and/or box iteration, across multiple event processors, through the auto_remote and inetd to get to the database. In an exemplary embodiment, this is cut out and communication with the database is direct, independent and asynchronous of the other event processor activity. In one embodiment, the threads are enabled to communicate with the databases simultaneously.

Further, there are performance gains made in the consolidation under a single process. The inter-thread communication is simpler and quicker than inter-process communication and threads switch context quicker, reducing pressure on the entire system.

The event processor of the present disclosure in one embodiment also improves the database interface. The interface is uniform and allows, for instance, small, shared objects to interface with the various database vendors and thereby substantially reduces the job scheduling system footprint. The interface can also be extended into new database vendors or to accommodate new database vendor releases. Dual server mode performance is improved and made more robust by localizing it within the interface and exploiting parallelism.

The event processor of the present disclosure in one embodiment runs under a smaller footprint utilizing the shared database objects. It is a simpler runtime configuration since it is a single process. The failover model is more responsive and more robust as it no longer need to work in the context of the event processor and/or box iteration across multiple event processor processes and through the inetd and auto_remote to get to the database. Dual server performance is enhanced through parallelism and the database rollover model enjoys advantages similar to the failover model. Further, the exemplary event processor processes significantly higher throughput and proportionately fewer cycles are used in both the event processor and data server.

Failover model used for the above-described event processor will now be described. In one embodiment, a plurality of failure points may be eliminated by a reduction in the number of processes involved in the failover model. For example, because the event processor of the present disclosure in one embodiment is a single process that is multi-threaded, there is no event processor to event processor IPC (interprocess communication), no forking, and no child handling.

A tiebreaker process is included in one embodiment of the present application and the functionality known as the "dibs file" is put into the database. In one embodiment, the tiebreaker only comes into play in dual server mode.

Figure 2:
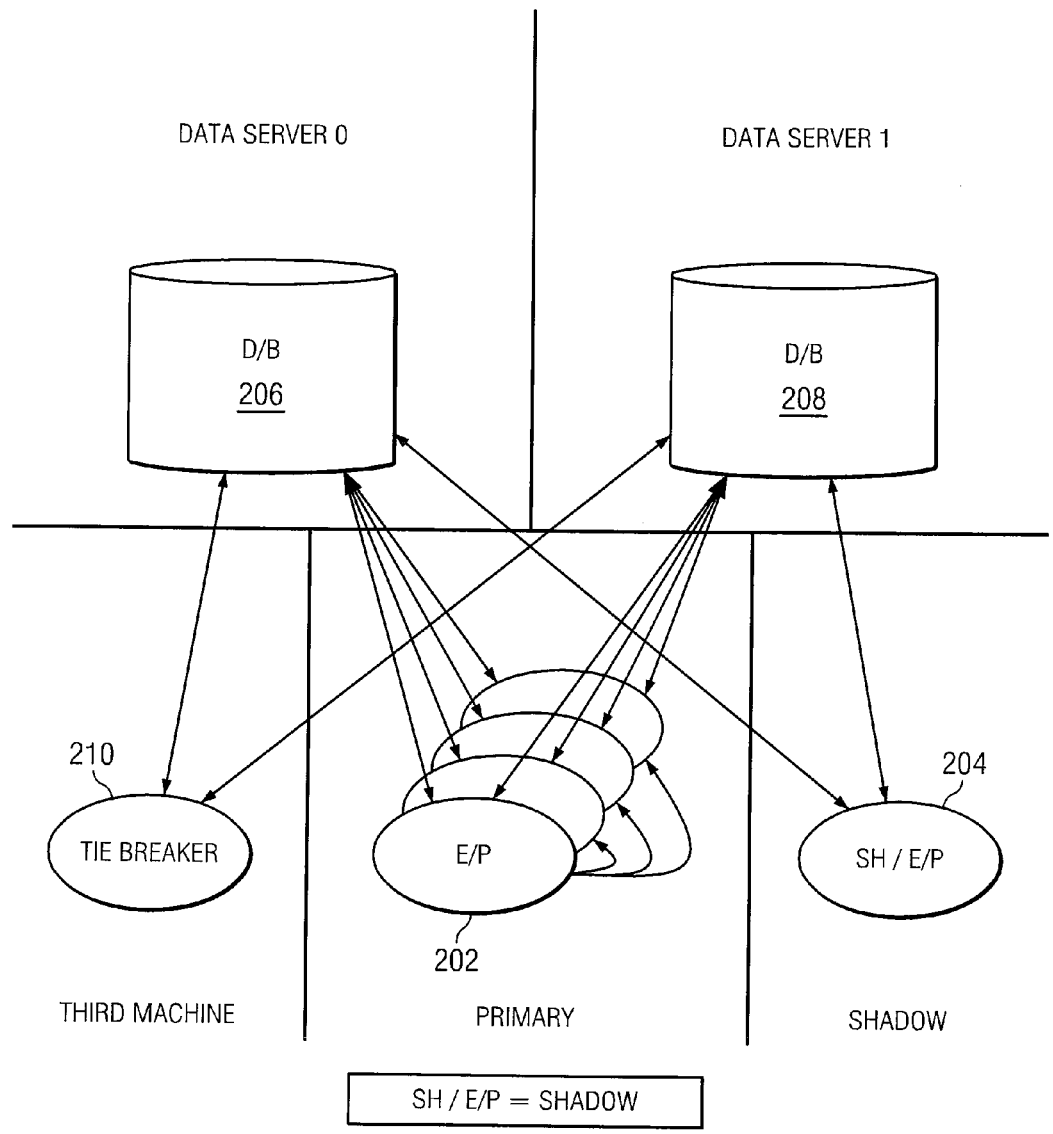
FIG. 2 is a diagram illustrating the components for failover procedure in one embodiment.

FIG. 2 is a diagram illustrating the components for failover procedure in one embodiment. In one embodiment, there are two levels of failover, 0 and 1. Level 0 is single server mode. Its configuration includes, for example, of a primary 202 and shadow 204 event processor and a single database 206. Level 1 introduces the second data server 208 and the tiebreaker 210 process. The tiebreaker is similar to the 'third machine.' The tiebreaker machine, for instance, straightens out confusion that may occur between the two data servers. Failover and High Availability are run independently of one another or they can be combined.

A component of this model is an 'accessor' object which includes a pair of three integer pairs, (pid, time0). The pid is the pid (process identifier) of the accessor. Time0 is the d/b time of the most recent access. The processes described below each access this object and can accomplish the existing failover algorithms given the information in these objects, maintained independently in each data server 206 208 in the case of dual server mode.

The following description applies to level 0, failover in single server mode in one embodiment. In the following description, references to "primary" and "shadow" refer to a primary event processor and a shadow (backup) event processor respectively. The primary 202 registers its status in the database 206 at a specified cadence. The shadow 204 reads this status at the same cadence and knows that the primary 202 is healthy and that it (shadow) remains a shadow. If the shadow 204 determines that the state of the primary 202 is not 'up' it goes into a 'pending takeover' state. The shadow 204 rechecks the state of the primary 202 and via a global, turns the primary 202 inactive. Thus if the primary 202 comes back, it will shut itself down. Once the shadow 204 confirms the primary 202 has been set inactive, the shadow 204 takes over.

If the shadow 204 cannot reach the data server 206, it shuts down. Failure to register the shadow's state sets an alarm in the primary 202 and the primary 202 alerts the operator that the shadow 204 has terminated.

The following describes level 1, failover in dual server mode in one embodiment. Also referred to as HA/DS, level 1 introduces the second data server 208 and the tiebreaker 210 process. The shadow 204 monitors both data servers 206 208 for the state of the primary 202. If the primary 202 is 'down' according to both data servers 206 208, the shadow 204 sets the primary 202 inactive and takes over.

It is possible that the shadow 204 can establish 1) the primary 202 e/p has failed to update the secondary data server 208; and 2) the shadow 204 cannot connect to the primary data server 206.

Now two independent instances may be allowed to run. Given that potential, the tiebreaker 210 residing on a third machine confirms, or fails to confirm, the shadow's perception of the primary.

If the tiebreaker 210 confirms a break between primary e/p 202 and primary data server 206, the third machine sets the primary 202 inactive and sets the shadow active 204.

The following object resides in both databases 206 208.

| data server (d/s) 0 | | data server (d/s) 1 | | |
|---|---|---|---|---|
| t_0 | pid | t_0 | pid | // primary |
| t_0 | pid | t_0 | pid | // shadow |
| t_0 | pid | t_0 | pid | // ping |

In one embodiment, failover procedure is a thread in each e/p and this thread is the tiebreaker program, which could be extended to a full third failover e/p.

The following pseudo code illustrates a failover thread in one embodiment.

```
FailoverThread( ) {
    for (;;) {
        for (j=0;j<2;j++) {
            for (n=0;n<3;n++) {
                machine(n) {
                    calls d/s__((j+1)%2)
                    posts t__0 next to its pid space
                    gets a copy of the entire accessor object
                    posts the entire object to d/s__(j%2)
                    posts t__0 next to its pid space
                    sleep (heartbeat)
                }
            }
        }
    }
}
```

If a d/s_j is unavailable, that side of the object is not changed and is apparent when the object is read from d/s, which is available.

The shadow can determine failover based on the information contained in the accessor object at a quick cadence and with few potential failure points.

When the shadow 204 has determined it is ready to take over, it turns on a flag, which shuts down the primary 202, should the primary 202 attempt to come back. In addition, a thread hi-water mark may be established to limit the number of threads the e/p 202 can start, to be configurable by the user. In one embodiment the TEP (third e/p) should not update the secondary database once a failover has occurred, and job scheduler system is in single server mode. The secondary is the database not in use under single server mode.

A pending shutdown state may be established such that all database activity will cease prior to a failover or rollover. This will allow the thread which monitors the data servers to connect/disconnect/reconnect with impunity, eliminating all small time deltas and race conditions which thwart the control necessary to insure database reads and writes are done from the desired database.

In addition, the time interval in which an EP is considered missing, for example, timeout_interval* number_of_reconnects, may be chosen.

In one embodiment, if a box is loaded and then a shutdown is received, the CHANGE_STATUS:RUNNING for the box may still need to be shown as in process' (depending on what's going on with the box during shutdown) so that the next time the EP starts it will re-queue the event and finish loading the box. More generally, the system is aware of what state things are left in when threads are shutdown, i.e., is it a recoverable state? In one embodiment, a persistent store on the local machine is not done for EPs because it will be lost in a rollover to shadow.

In another embodiment, indication of an HA failover is done automatically to, for example, prevent confusion about a failover whose in charge (primary event processor or shadow event processor). When HA gets into a pend mode and then connections are restored, a check is performed for any failovers before continuing. A timeout wrapper may be added. The above-described failover method may apply to configurations such as dual-server/high-availability, dual-server alone, high-availability alone.

The system and method of the present disclosure may be implemented and run on a general-purpose computer. For example, the system and method may be implemented as set of computer instructions to be stored on computer memory units and executed on the computer processor. The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. An event processor system, comprising:
a database;
a single process event processor configured to retrieve a job from the database and generate a message to schedule the job on a computer node, the single process event processor comprising a plurality of threads enabled to handle an event, each of the plurality of threads is connected to the database and executes asynchronously, wherein the generated message is associated with the event; and
wherein the plurality of threads comprises:
one or more event processor threads configured to retrieve the event and dispatch the event;
one or more connectivity threads configured to establish communication with one or more agents residing on a node where the event is to be processed; and
one or more event handler threads configured to receive the event dispatched by the one or more event processor threads, the one or more event handler threads further operable to communicate the event to the one or more connectivity threads.

2. The system of claim 1, wherein the plurality of threads are enabled to handle failover.

3. The system of claim 1, further including a shadow event processor used for failover.

4. The system of claim 1, wherein the system further includes dual data servers and a tie breaker for handling failover between a primary event processor and a secondary failover event processor.

5. An event processor method, comprising:
using a single process event processor, to retrieve one or more jobs from a database, the single process event processor comprising a plurality of threads to handle an event;
asynchronously executing each of the plurality of threads;
connecting each of the plurality of threads to the database;
generating a message to schedule the one or more jobs on one or more computer nodes, wherein the generated message associated with the event; and
wherein the plurality of threads comprises one or more event processor threads, one or more connectivity threads, and one or more event handler threads, and further comprising:
using the one or more event processor threads of the single process event processor to retrieve the event and dispatch the event; and
using the one or more connectivity threads of the single process event processor to establish communication with one or more agents residing on a node where the event is to be processed; and
using the one or more event handler threads of the single process event processor to receive the event dispatched by the one or more event processor threads, and communicate the event to the one or more connectivity threads.

6. The method of claim 5, further including:
using the plurality of threads to handle failover.

7. A non-transitory computer-readable medium storing program instructions executable by a processor to perform a method comprising:
using a single process event processor to retrieve one or more jobs from a database, the single process event processor comprising a plurality of threads to handle an event;
asynchronously executing each of the plurality of threads;
connecting each of the plurality of threads to the database;
generating a message to schedule the one or more jobs on one or more computer nodes, wherein the generated message is associated with the event; and
wherein the plurality of threads comprises an event processor thread, a connectivity thread, and an event handler thread, and further comprising
using the event processor thread of the single process event processor to retrieve the event and dispatch the event; and
using the connectivity thread of the single process event processor to establish communication with an agent residing on a node where the event is to be processed; and
using the event handler thread of the single process event processor to receive the event dispatched by the event processor thread, and communicate the event to the connectivity thread.

8. The program storage device of claim 7, wherein the method further comprises:
allowing the plurality of threads to handle failover.

9. An event processor system for job scheduling and management applications, comprising:
computer memory encoded with a program of instructions, the program of instructions, when executed by a computer, being operable to cause a single process event processor operable to retrieve one or more jobs from a database and generate a message to schedule the one or more jobs on one or more computer nodes, the single process event processor comprising a plurality of threads enabled to handle an event, each of the plurality of threads executes asynchronously and is connected to the database, wherein the generated message is associated with the event; and
wherein the plurality of threads includes at least:
one or more event processor threads operable to retrieve the event and dispatch the event;
one or more connectivity threads operable to establish communication with one or more agents residing on a node where the event is to be processed;
one or more event handler threads operable to receive the event dispatched by the one or more event processor threads, the one or more event handler threads further operable to communicate the event to the one or more connectivity threads.

10. The system of claim 9, wherein the plurality of threads are enabled to handle failover.

11. The system of claim 9, further including a shadow event processor used for failover.

12. The system of claim 9, wherein the system further includes dual data servers and a tie breaker for handling failover between a primary and a secondary failover event processors.

* * * * *